March 15, 1966     J. A. CRABB     3,240,240
EMERGENCY AIR APPARATUS
Filed July 30, 1962
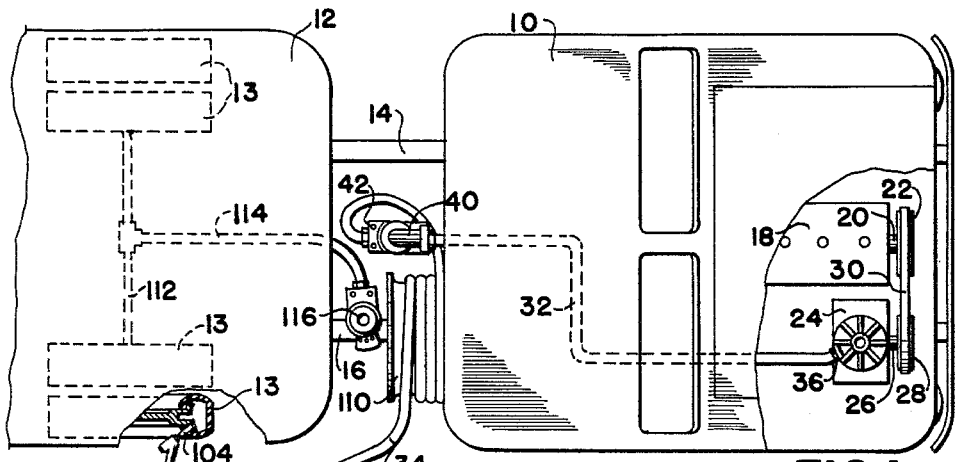
FIG. 1
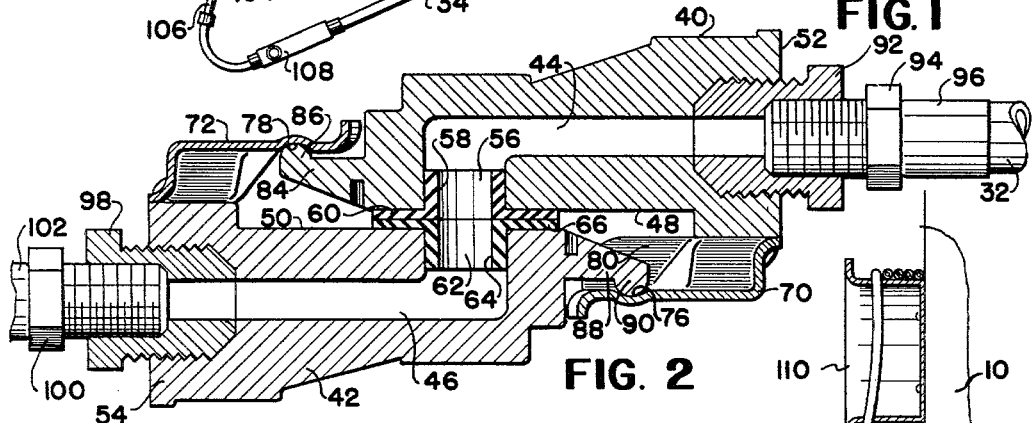
FIG. 2
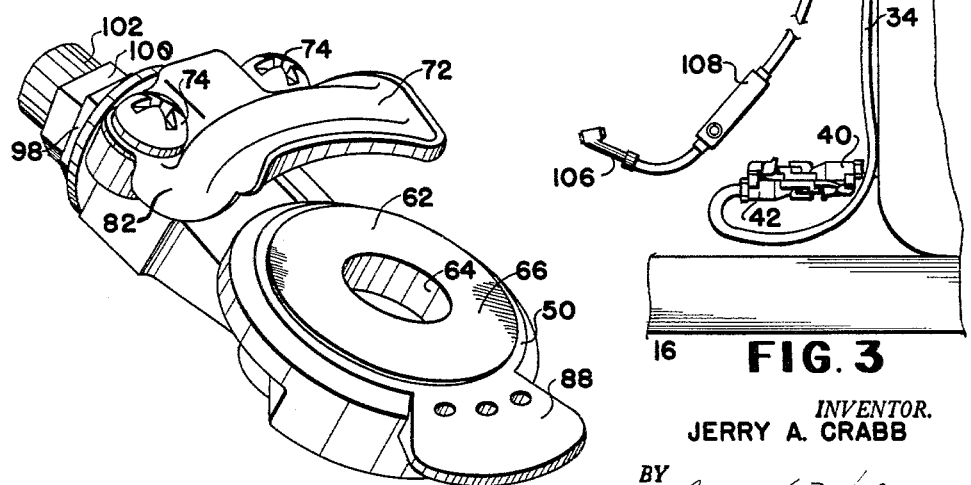
FIG. 3
FIG. 4
INVENTOR.
JERRY A. CRABB
BY *John A. Widdowson*
ATTORNEY

United States Patent Office 3,240,240
Patented Mar. 15, 1966

3,240,240
EMERGENCY AIR APPARATUS
Jerry A. Crabb, 1427 W. 69th St. N., Wichita, Kans.
Filed July 30, 1962, Ser. No. 213,230
1 Claim. (Cl. 141—38)

This invention relates to tire inflating means and more specifically to apparatus for inflating tires or the like for use, during emergency or routine maintenance operations, even in remote locations.

Various types of tire inflating means are known to the art including those commonly used at service stations and the like which are permanently fixed in place. Means are also known to equalize pressure in various tires of a vehicle to result in a common pressure therebetween. Other tire inflating means are known which are highly complicated and require substantial modification of the using vehicle in order to provide tire inflating means and due to their complexity and structure such have not gained substantial commercial acceptance. The need for a suitable tire inflating apparatus for emergency or routine maintenance has long existed in the art, particularly for use with relatively heavy vehicles such as heavy duty trucks, semi-trailer truck-tractor combinations and the like where very heavy loads are normally carried and lack of proper inflation in the tires in the vehicle frequently results in damage to the tires which are quite expensive and are a major expense to trucking companies and others using these vehicles.

In accordance with the present invention tire inflating means are provided which include first and second conduit means, one of the conduit means being flexible. Two coupling members are provided and each of the conduit means has one of the coupling members secured thereto on one end portion thereof. The coupling members have cooperating portions and are removably connectible together. The coupling members each have a bore therethrough and are connectible together with the bores in fluid communication. Tire valve engaging means are secured to the other end portion of the flexible conduit means and are operable to pass air or the like from the conduit means into a tire valve or the like. The other end portion of the other of the conduit means has means therewith connectible to air supply means to provide air under pressure for passage through both of the conduit means and the coupling members to the tire valve.

Accordingly, it is an object of the invention to provide new air inflating apparatus.

Another object of the invention is to provide new emergency air apparatus having quick connect and disconnect coupling means therewith so that the apparatus can be quickly and easily assembled for use.

A further object of the invention is to provide new tire inflating apparatus for a vehicle having an air compressor therewith so that the tires of the vehicle can be inflated to the desired pressure even at remote locations where fixed inflating apparatus is not available.

Another object of the invention is to provide air inflating apparatus for a vehicle or the like which operates on a conventional air pressure system and which is disconnectible during periods of non-use.

A further object of the invention is to provide new emergency air apparatus having air pressure means therewith so that the proper amount of air can be supplied to each tire.

Various other objects, advantages and features of the invention will become apparent to those skilled in the art from the following description taken in connection with the drawings, in which:

FIG. 1 is a top plan view, partially broken away, showing the cab and a portion of a truck bed or trailer having the emergency air apparatus of the invention.

FIG. 2 is an enlarged partial cross section view taken through the coupling means of the apparatus of the invention in assembled relation.

FIG. 3 is a partial side elevation view showing the apparatus with the coupling means in assembled relation and the flexible conduit means held by reel means on the cab of the vehicle.

FIG. 4 is an enlarged partial isometric view showing one of the coupling means used with the apparatus of the invention.

The following is a discussion and description of a preferred specific embodiment of the new emergency air apparatus of the invention, such being made with reference to the drawings whereon the same reference numerals are used to indicate the same or similar parts and/or structure. It is to be understood that such discussion and description is not to unduly limit the scope of the invention.

Referring now to the drawings in detail, FIG. 1 illustrates a preferred specific embodiment of the invention mounted for use with a vehicle such as a truck or the like having a cab or tractor portion 10 and a trailer or truck bed portion 12 movably mounted on tires 13. Trailer 12 is connected by frame members 14 and 16 of any suitable construction to the cab or trailer 10. The vehicle is powered by a conventional motor or engine 18 which drives a shaft 20 having a pulley 22 connected thereto. An air compressor of any suitable design or construction is shown at 24 and is preferably mounted beneath the hood of the vehicle and has a shaft 26 which has a pulley 28 secured thereto. The pulley 22 is connected to the pulley 28 by a belt 30 or other suitable connecting means and in operation the engine 18 furnishes power through the belt 30 to the compressor 24 to operate the compressor and thus provide a source of air under pressure.

Conduit means are provided to receive and transmit air under pressure from compressor 24 to the desired location, such as to the tires 13 of the vehicle. In the preferred embodiment of the invention two conduits are provided as shown at 32 and 34 and at least the conduit 34 is made of a flexible material and preferably both conduits are flexible. The conduits can be of any suitable size or construction, one-half to three-eighths inch air hose having been found satisfactory for most uses. Conduit 32 has a coupling or the like 36 at one end portion thereof which is used to secure the conduit 32 to the outlet of the compressor 24. The conduit 32 is positioned relative to the cab 10 so as to be out of the interferring way thereof during operation and preferably the other end portion of conduit 32 is located at the rear portion of the cab 10 as illustrated in the drawings.

Two elongated coupling members 40 and 42 are provided and the coupling members are preferably of like construction. The coupling members 40 and 42 each have a bore therethrough as shown at 44 and 46, respectively, with openings at the ends of the bores at the sides 48 and 50 and at the ends 52 and 54, respectively. Resilient sealing means 56 is provided for the coupling member 40 and such is preferably shaped to include a cylindrical portion 58 which is coaxially positioned in the opening at the side 48 and an integral annular flange portion 60 which extends radially outwardly from the cylindrical portion 58 and engages the side 48 of the coupling member 40. Sealing means 62 is provided for the coupling member 42 and is of like construction with the sealing means 56 and includes a cylindrical portion 64 positioned in the bore 46 and an annular portion 66 which extends radially outwardly from the cylindrical portion 64 and abuts and rests upon the side 50 of the coupling member 42. The sealing means 56 and 62 can be made of any suitable material such as rubber, synthetic rubber or rubber-like materials, suitable plastics, etc.

Suitable latch or fastening means 70 and 72 are provided with the coupling members 40 and 42, respectively, to fasten the members in assembled relation. The latch members 70 and 72 are preferably thin and are secured to the sides 48 and 50 of the coupling members by fastening means, such as the bolts 74, FIG. 4. The latch members 70 and 72 are positioned in spaced and overlying relation relative to the faces 48 and 50 of the coupling members 40 and 42, respectively. Each of the latch members has an elongated arcuate recess therein which extends transversely thereacross on the lower side of the coupling members as illustrated at 76 and 78. The latch members 70 and 72 are closed at one end portion thereof as illustrated at 80 and 82, respectively, in FIGS. 2 and 4 and are open at the other end or side thereof to admit a portion of the other coupling member when connecting same together.

The end portion of the coupling member 40 opposite from the end 52 is preferably relatively thin and tapers to a relatively thin end portion 84 and has an arcuate lip thereon as shown at 86. The coupling member 42 tapers to a relatively thin end portion 88 having a similarly shaped lip portion 90 thereon at the outermost extremity thereof. The lip portions 86 and 90 are dimensioned and shaped so as to be received and held by the arcuate recesses 76 and 78 of the coupling members.

The coupling members 40 and 42 are secured to each other by positioning them in mirror image relation as best illustrated in FIG. 2 with the side faces 48 and 50 in facing relation and with the annular portions 60 and 66 of the sealing means 56 and 62 in tight fitting and sealing engagement with each other. The lip portions 86 and 90 of the end portions 84 and 88, respectively, of the coupling members are snugly received in the recesses 78 and 76, respectively, of the latch portions 72 and 70 to continually urge the sealing members into tight fitting and sealing engagement. When assembled, the coupling members have the bores therethrough in fluid communication with each other so that air or the like received by one of the bores of one of the coupling members is transmitted to the bore of the other of the coupling members.

The coupling members 40 and 42 can be secured to the end portions of the conduit means 32 and 34, respectively by any suitable means. As illustrated in FIG. 2 this can include a connecting member 92 which is threadedly mounted in the end 52 of the coupling member 40 and has a bore therethrough which threadedly receives a plug or the like 94 which is attached to the end portion of hose or conduit 32 by a metallic tube or the like 96. A similar connecting member 98 can be threadedly mounted in the end portion 54 of the coupling member 42 and receive a plug or the like 100 having suitable securing means 102 therewith to attach the coupling member 42 to the hose 34.

Means are provided with the other end portion of the conduit means 34 to engage a tire valve or the like 104 in air inflating relation. This is illustrated in the drawings as a common air chuck 106 which is preferably of the type that is normally closed and is opened for the passage of air by engaging and being pressed upon the valve 104, thus eliminating the need for manually operated valve means to operate the apparatus.

Suitable means can be provided with the apparatus of the invention for accurately determining the amount of air pressure in one of the tires 13. This is illustrated in the preferred embodiment of the invention as a gauge 108 which is positioned in the conduit means 34 and can be provided with visual indicating means to indicate pressure in the tire. This is quite desirable in many instances, particularly where the apparatus is used at remote locations and where the usual air gauge is not available. Furthermore, even if the driver is normally provided with an air gauge such often becomes lost or misplaced in use and by incorporation of the gauge 108 as an integral portion of the apparatus it is always possible to obtain the correct air pressure in the tires 13.

Preferably, means are provided to receive and hold the conduit means 34 during periods of non-use. In the preferred embodiment illustrated in the drawings this is provided by a reel 110 which can be mounted on the truck in any suitable position, such as on the rear portion of the cab 10 when such is spaced from the trailer or load carrying portion 12 of the vehicle. The conduit means 34 can be wrapped around and held by the reel 110 as illustrated in FIGS. 1 and 3 and thus prevents loss of the apparatus or failure of the driver to carry same with him when going on the road.

In operation, the motor 18 drives compressor 24 to create a source of air under pressure which is transmitted through the conduit means 32 to the coupling 40 and passes through the bore 44 therein into the bore 46 of coupling member 42. Air under pressure leaving the coupling member 42 passes into the flexible conduit means 34, through the air gauge 108 and is supplied to the air chuck 106. When the tire valve 104 is engaged by the air chuck 106 the chuck is open to the passage of air and air is provided to the tire 13 to inflate same to the desired operating pressure. Conduit means 34 is of length so that the chuck 106 can reach or be moved into engagement with any of the tires 13 of the vehicle.

While the apparatus of the invention is suitable with any type of vehicle, such is particularly desirable for use with vehicles utilizing air brakes with the cab and/or trailer portion thereof. As illustrated in FIG. 1, an air conduit 112 is then provided and connected to the brakes of the wheels of the vehicle and a conduit 114 is connected in one end to the conduit 112 to supply air under pressure thereto. Conduit 114 is secured in its other end portion to a coupling member 116 which is preferably of like construction to the coupling members 40 and 42 or is at least compatible with an attachable to the coupling member 40 so that the coupling members 40 and 116 can be secured together in a manner similar to that illustrated in FIG. 2 during normal road operation and air under pressure from compressor 24 will thus be supplied to the air brakes when needed. When the vehicle is stopped and it is desired to inflate or check the pressure of the air in tires 13, it is merely necessary to disconnect the coupling member 116 from the coupling member 40 and connect the coupling member 42 thereto in the manner described and the flexible conduit 34 can then be extended to inflate the various tires 13 to the required pressure.

While the invention has been described in connection with a preferred specific embodiment thereof it will be understood that this description is intended to illustrate and not limit the scope of the invention, which is defined by the claim.

I claim:

Tire inflating apparatus for a vehicle having a power plant with an air compressor operatively connected to and driven by said power plant comprising, in combination, two elongated flexible conduits, one of said conduits being removably connected in one end portion to said compressor to receive air under pressure therefrom, two elongated coupling members of like construction, each of said coupling members having a bore therethrough with openings at one end thereof and at one side thereof, each of said coupling members having resilient sealing means therewith including a cylindrical portion coaxially positioned in said opening at said one side of said coupling members and an integral annular flange extending radially outwardly from said cylindrical portion and engaging said one side of said coupling members, each of said coupling members having a thin latch member secured to one end portion thereof and positioned in spaced and overlying relation to said one side of said coupling members and having an elongated arcuate recess therein extending transversely thereacross and facing said one side of said coupling members, each of said latch members being open at one side and closed at the other side, the other end portion of each of said coupling members being tapered to a relatively thin end with an arcuate lip thereon shaped and of size to be received in and held by said latch member of the other of said coupling members, two connecting members, one of said coupling members being removably secured to the other end of said one of said conduits by one of said connecting members, the other of said conduits having the other of said connecting members therewith removably securing the other of said coupling members to one end thereof with said coupling members being removably connected together with said sealing means in engagement and with said bores in communication and with said lips received by said recesses in said latch members to place said conduits in fluid communication, an air gauge in an intermediate portion of said other of said conduits, an air chuck secured to the other end of said other of said conduits and having means adapted to engage a tire valve in air inflating relation, and reel means mounted on said vehicle to receive and hold said conduits during periods of non-use, said apparatus being constructed and adapted so that air under pressure can be provided from said compressor through said conduits to said chuck to inflate a tire.

References Cited by the Examiner

UNITED STATES PATENTS

| | | | |
|---|---|---|---|
| 899,620 | 9/1908 | Ross | 230—33 |
| 2,185,667 | 6/1940 | Hines | 230—33 |
| 3,052,489 | 9/1962 | Stoudt | 285—69 |

SAMUEL ROTHBERG, *Primary Examiner.*

LAVERNE D. GEIGER, *Examiner.*